United States Patent
Canady et al.

(10) Patent No.: US 12,508,086 B2
(45) Date of Patent: *Dec. 30, 2025

(54) SYSTEM AND METHOD FOR VOICE-CONTROL OF OPERATING ROOM EQUIPMENT

(71) Applicant: Jerome Canady Research Institute for Advanced Biological and Technological Sciences, Takoma Park, MD (US)

(72) Inventors: Jerome Canady, Lakeland, FL (US); Taisen Zhuang, Rockville, MD (US); Changhan Jun, Beltsville', MD (US)

(73) Assignee: Jerome Canady Research Institute for Advanced Biological and Technological Sciences, Takoma Park, MD (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/082,346

(22) Filed: Dec. 15, 2022

(65) Prior Publication Data
US 2023/0122461 A1    Apr. 20, 2023

Related U.S. Application Data

(63) Continuation-in-part of application No. 17/471,828, filed on Sep. 10, 2021, now Pat. No. 11,967,425.
(Continued)

(51) Int. Cl.
*A61B 34/00* (2016.01)
*A61B 18/12* (2006.01)
(Continued)

(52) U.S. Cl.
CPC .......... *A61B 34/25* (2016.02); *A61B 18/1206* (2013.01); *A61B 34/37* (2016.02);
(Continued)

(58) Field of Classification Search
CPC ............ A61B 34/25; H04R 3/00; H04R 1/04; G06F 3/167; G10L 15/22
See application file for complete search history.

(56) References Cited

U.S. PATENT DOCUMENTS

| 4,040,426 A | 8/1977 | Morrison |
| 4,429,694 A | 2/1984 | McGreevy |

(Continued)

FOREIGN PATENT DOCUMENTS

| CA | 2895975 A1 | 6/2014 |
| CA | 3112875 A1 | 3/2020 |

(Continued)

OTHER PUBLICATIONS

Zinchenko, Kateryna, Chien-Yu Wu, and Kai-Tai Song. "A study on speech recognition control for a surgical robot." IEEE Transactions on Industrial Informatics 13.2 (2016): 607-615. (Year: 2016).*

(Continued)

*Primary Examiner* — Paras D Shah
*Assistant Examiner* — Oluwadamilola M Ogunbiyi
(74) *Attorney, Agent, or Firm* — 24IP Law Group USA, PLLC; Timothy R. DeWitt

(57) ABSTRACT

A system and method for voice control of operating room electrical equipment. The system comprises an electrosurgical generator having a controller with a memory, a graphical user interface controlled by said controller, a power module, a field programmable gate array, and a voice recognition module connected to said field programmable gate array, a data storage connected to said controller in said electrosurgical generator; and electrical operating room equipment connected to said voice recognition module, wherein said electrical operating room equipment is configured to receive and decrypt encrypted commands from said voice recognition module. The audio input to the voice (Continued)

recognition system may be a microphone chip in a electrosurgical accessory.

3 Claims, 11 Drawing Sheets

Related U.S. Application Data

(60) Provisional application No. 63/076,771, filed on Sep. 10, 2020.

(51) Int. Cl.
| | | |
|---|---|---|
| *A61B 34/37* | (2016.01) | |
| *G06F 3/16* | (2006.01) | |
| *G06F 21/60* | (2013.01) | |
| *G10L 15/08* | (2006.01) | |
| *G10L 15/19* | (2013.01) | |
| *G10L 15/22* | (2006.01) | |
| *H04R 1/04* | (2006.01) | |
| *H04R 3/00* | (2006.01) | |

(52) U.S. Cl.
CPC ............ *G06F 3/167* (2013.01); *G06F 21/602* (2013.01); *G10L 15/19* (2013.01); *G10L 15/22* (2013.01); *H04R 1/04* (2013.01); *H04R 3/00* (2013.01); *G10L 2015/088* (2013.01); *G10L 2015/223* (2013.01)

(56) References Cited

U.S. PATENT DOCUMENTS

| | | | |
|---|---|---|---|
| 4,781,175 A | 11/1988 | Bertrand et al. | |
| 5,207,675 A | 5/1993 | Canady | |
| 9,546,005 B2* | 1/2017 | Li | G08G 5/21 |
| 9,999,462 B2 | 6/2018 | Canady et al. | |
| 10,213,614 B2 | 2/2019 | Guron et al. | |
| 10,277,597 B2* | 4/2019 | Darnell | H04L 9/3234 |
| 10,334,702 B1* | 6/2019 | Orysh | H05B 47/197 |
| 11,322,248 B2* | 5/2022 | Grantcharov | G06F 17/40 |
| 2002/0156365 A1* | 10/2002 | Tsekos | A61B 5/708 |
| | | | 600/417 |
| 2008/0046250 A1* | 2/2008 | Agapi | G10L 15/075 |
| | | | 704/275 |
| 2008/0167860 A1* | 7/2008 | Goller | G06F 8/65 |
| | | | 704/270.1 |
| 2012/0316474 A1* | 12/2012 | Bonutti | A61B 90/06 |
| | | | 601/2 |
| 2013/0253501 A1* | 9/2013 | Joseph | A61B 18/1206 |
| | | | 606/34 |
| 2013/0296846 A1 | 11/2013 | Canady et al. | |
| 2013/0338267 A1* | 12/2013 | Appleby | C08L 83/04 |
| | | | 523/458 |
| 2014/0378892 A1 | 12/2014 | Guron et al. | |
| 2015/0142442 A1* | 5/2015 | Plumb | G10L 15/08 |
| | | | 704/251 |
| 2015/0342667 A1* | 12/2015 | Cornacchia | A61B 18/1442 |
| | | | 606/51 |
| 2016/0202719 A1* | 7/2016 | Lippman | B60T 8/3255 |
| | | | 74/513 |
| 2016/0232010 A1* | 8/2016 | Dicks | G16H 40/67 |
| 2017/0000552 A1* | 1/2017 | Asher | A61B 18/1206 |
| 2017/0279602 A1* | 9/2017 | Pham | H04L 63/0442 |
| 2018/0075842 A1* | 3/2018 | Zhao | G10L 15/063 |
| 2019/0027135 A1* | 1/2019 | Kim | G10L 15/22 |
| 2019/0069145 A1* | 2/2019 | Dantsker | G06F 40/169 |
| 2019/0103108 A1* | 4/2019 | Song | G10L 15/1815 |
| 2019/0350640 A1* | 11/2019 | Wolter | A61B 18/00 |
| 2019/0361954 A1* | 11/2019 | Page | G06F 3/0673 |
| 2020/0058284 A1* | 2/2020 | Miller | A61B 1/0004 |
| 2020/0214112 A1* | 7/2020 | Magielse | G10L 15/22 |
| 2020/0306653 A1* | 10/2020 | Daniel | A63G 33/00 |
| 2021/0277774 A1* | 9/2021 | Parasram | H04L 63/062 |
| 2021/0307841 A1 | 10/2021 | Buch | |
| 2022/0387116 A1* | 12/2022 | Hashimoto | A61B 34/20 |

FOREIGN PATENT DOCUMENTS

| | | | | |
|---|---|---|---|---|
| DE | 102017115247 A1 | * | 1/2019 | |
| DE | 102020104855 A1 | * | 8/2021 | |
| EP | 2740413 A1 | * | 6/2014 | ............ A61B 17/00 |
| EP | 3603476 A1 | * | 2/2020 | ........ A61B 1/00006 |
| KR | 20130104097 A | | 9/2013 | |
| KR | 20150074313 A | | 7/2015 | |
| WO | 2015017770 A | | 2/2015 | |
| WO | 2017160232 A1 | | 9/2017 | |
| WO | 2018118415 A1 | | 6/2018 | |
| WO | 2018191265 A1 | | 10/2018 | |
| WO | 2019199281 A1 | | 10/2019 | |
| WO | WO-2020101864 A1 | * | 5/2020 | ........ A61B 18/1206 |

OTHER PUBLICATIONS

Miao, Yiming, et al. "Telesurgery robot based on 5G tactile internet." Mobile Networks and Applications 23 (2018): 1645-1654. (Year : 2018).*

Zhang, Meng, Anand Raghunathan, and Niraj K. Jha. "Trustworthiness of medical devices and body area networks." Proceedings of the IEEE 102.8: 1174-1188. (Year: 2014).

Zinchenko, Kateryna, Chien-Yu Wu, and Kai-Tai Song. "A study on speech recognition control for a surgical robot." IEEE Transactions on Industrial Informatics 13.2: 607-615. (Year: 2016).

* cited by examiner

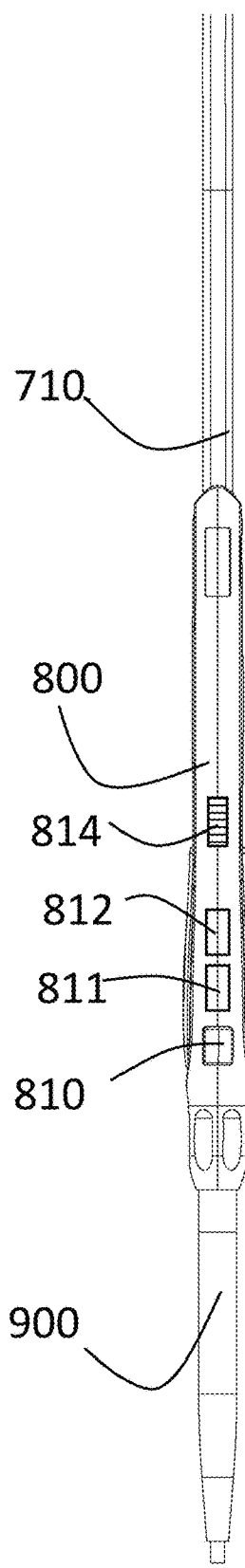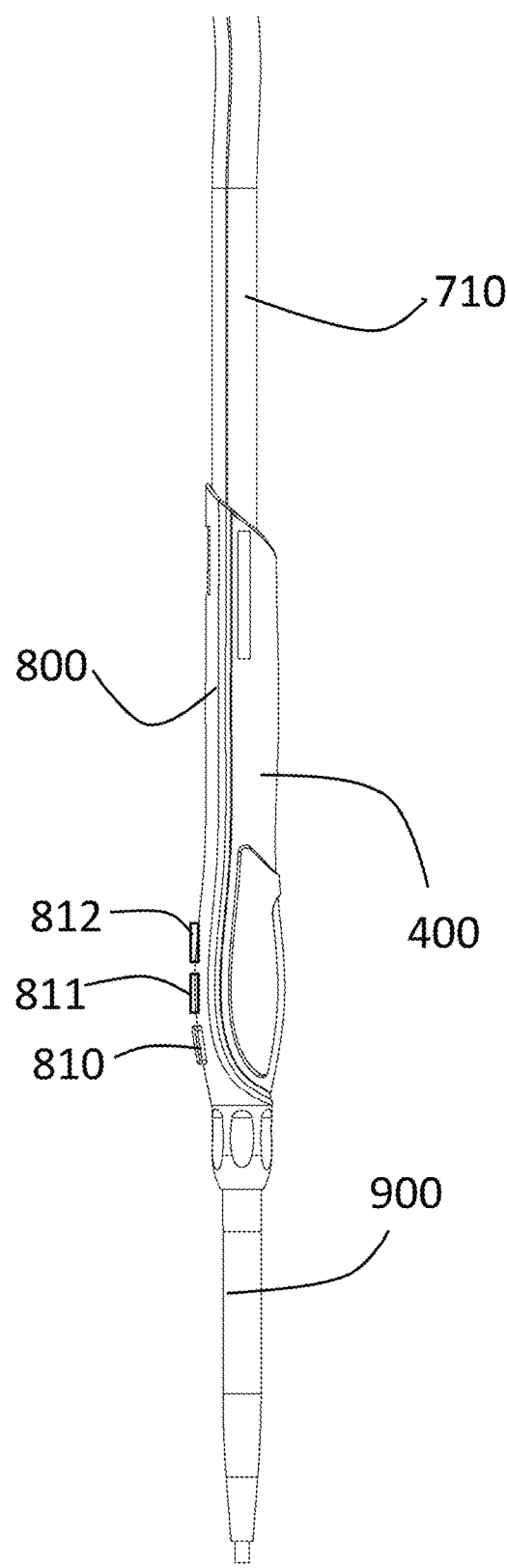
FIG. 7D
FIG. 7E

SYSTEM AND METHOD FOR VOICE-CONTROL OF OPERATING ROOM EQUIPMENT

CROSS-REFERENCE TO RELATED APPLICATIONS

The present application is a continuation-in-part of U.S. patent application Ser. No. 17/471,828, which claims the benefit of the filing date of U.S. Provisional Patent Application Ser. No. 63/076,771 filed by the present inventors on Sep. 10, 2020.

The aforementioned patent applications are hereby incorporated by reference in their entirety.

STATEMENT REGARDING FEDERALLY SPONSORED RESEARCH OR DEVELOPMENT

None.

BACKGROUND OF THE INVENTION

Field of the Invention

The present invention relates to gas-enhanced electrosurgical systems, and more particularly, to a system and method for voice-control of a gas-enhanced electrosurgical system and other electronic operating room equipment.

Brief Description of the Related Art

A variety of different electrosurgical generators are known. U.S. Pat. No. 4,429,694 to McGreevy disclosed an electrosurgical generator and argon plasma system and a variety of different electrosurgical effects that can be achieved depending primarily on the characteristics of the electrical energy delivered from the electrosurgical generator. The electrosurgical effects included pure cutting effect, a combined cutting and hemostasis effect, a fulguration effect and a desiccation effect. Fulguration and desiccation sometimes are referred to collectively as coagulation.

Another method of monopolar electrosurgery via argon plasma technology was described by Morrison in U.S. Pat. No. 4,040,426 in 1977 and McGreevy U.S. Pat. No. 4,781,175. This method, referred to as argon plasma coagulation (APC) or argon beam coagulation is a non-contact monopolar thermoablative method of electrocoagulation that has been widely used in surgery for the last twenty years. In general, APC involves supplying an ionizable gas such as argon past the active electrode to target tissue and conducting electrical energy to the target tissue in ionized pathways as non-arcing diffuse current. Canady described in U.S. Pat. No. 5,207,675 the development of APC via a flexible catheter that allowed the use of APC in endoscopy. These new methods allowed the surgeon, endoscopist to combine standard monopolar electrocautery with a plasma gas for coagulation of tissue.

Yet another system is disclosed in U.S. Patent Application Publication No. 2013/0296846, which disclosed a system for simultaneously cutting and coagulating tissue. Another system, referred to as a "cold atmospheric plasma" system, is disclosed in U.S. Patent Application Publication No. 2014/0378892.

Several different systems and methods for performing Cold Atmospheric Plasma (CAP) treatment have been disclosed. For example, U.S. Pat. No. 10,213,614 discloses a two-electrode system for CAP treatment of cancer cells.

Another exemplary Cold Atmospheric Plasma system is disclosed in U.S. Pat. No. 9,999,462. The disclosed system has two units, namely a Conversion Unit (CU) and a Cold Plasma Probe (CPP). The Conversion Unit is connected to high frequency electrosurgical generator (ESU) output and converts the ESU signal to a signal appropriate for performing cold atmospheric plasma procedures. The Cold Plasma Probe is connected to the Conversion Unit output. At the end of the Cold Plasma Probe cold plasma is produced and is thermally harmless to living tissue, i.e., it cannot cause burns to the tissue. This cold plasma, however, is deadly for cancer cells while leaving normal cells unaffected. The disclosed Cold Plasma Conversion Unit is unique in that it utilizes a high voltage transformer to up-convert the voltage (1.5-50 kV), down-convert the frequency (<300 kHz), and down-convert the power (<30 W) of the high-voltage output from an electrosurgical unit (U.S. Pat. No. 9,999,462).

Further, various systems and methods for controlling gas flow and an integrated gas-assisted electrosurgical generator having a graphical user interface is disclosed in WO2018/191265, entitled "Electrosurgical Gas Control Module" and WO2019199281, entitled "Gas Enhanced Electrosurgical Generator."

SUMMARY OF THE INVENTION

In a preferred embodiment, the present invention is a system for voice control of operating room electrical equipment. The system comprises an electrosurgical generator, a data storage and an electrosurgical accessory connected to the electrosurgical generator. The data storage may be internal to the electrosurgical generator or may be separate from the electrosurgical generator. The electrosurgical generator may comprise a controller having a memory, a graphical user interface controlled by the controller, a power module, a field programmable gate array; and a speech recognition module connected to the field programmable gate array. The data storage is connected to the controller in the electrosurgical generator. The electrosurgical accessory is connected to the electrosurgical generator and has a housing and a microphone chip. T microphone chip in the electrosurgical accessory is communicatively connected to the controller in the electrosurgical generator and the electrosurgical generator is configured to adopt settings based upon audio input through the microphone chip.

The system may further comprise electrical operating room equipment connected to the speech recognition module, wherein the electrical operating room equipment is configured to receive and decrypt encrypted commands from the speech recognition module. The electrical operating room equipment may be, for example, a robotic surgical system. The connection between the electrical operating room equipment and the speech recognition module may be wired or wireless. The connection between the data storage and the controller in the electrosurgical system may be wired or wireless.

In another embodiment, the present invention is a method for voice control of electrical operating room equipment with a speech recognition system. The method comprises activating a microphone on an electrosurgical accessory connected to the electrosurgical generator, communicating audio input received by the microphone in the electrosurgical accessory to the speech recognition system in the electrosurgical generator in response to activation of the microphone in the electrosurgical accessory, detecting a triggering event with the speech recognition system, identifying a voice instruction with the speech recognition system, validating grammar in an identified voice instruction, notifying the user that a voice command has been validated, encrypting the validated command, transmitting the encrypted validated command to electrical operating room equipment, receiving the encrypted validated command as the electrical operating room equipment, decrypting the received encrypted validated command at the electrical operating room equipment, determining at the electrical operating room equipment whether the decrypted command is valid; performing a safety evaluation on the decrypted command; executing the decrypted command on the electrical operating room equipment; and notifying the user that the decrypted command has been executed.

The electrical operating room equipment may be, for example, the electrosurgical generator or a robotic surgical system.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which:

FIG. 7D is a top view of a cold plasma scalpel and electrosurgical hand piece in accordance with a preferred embodiment of the present invention.

FIG. 7E is a second side view of a cold plasma scalpel and electrosurgical hand piece in accordance with a preferred embodiment of the present invention.

DETAILED DESCRIPTION OF THE PREFERRED EMBODIMENTS

Figure 1:
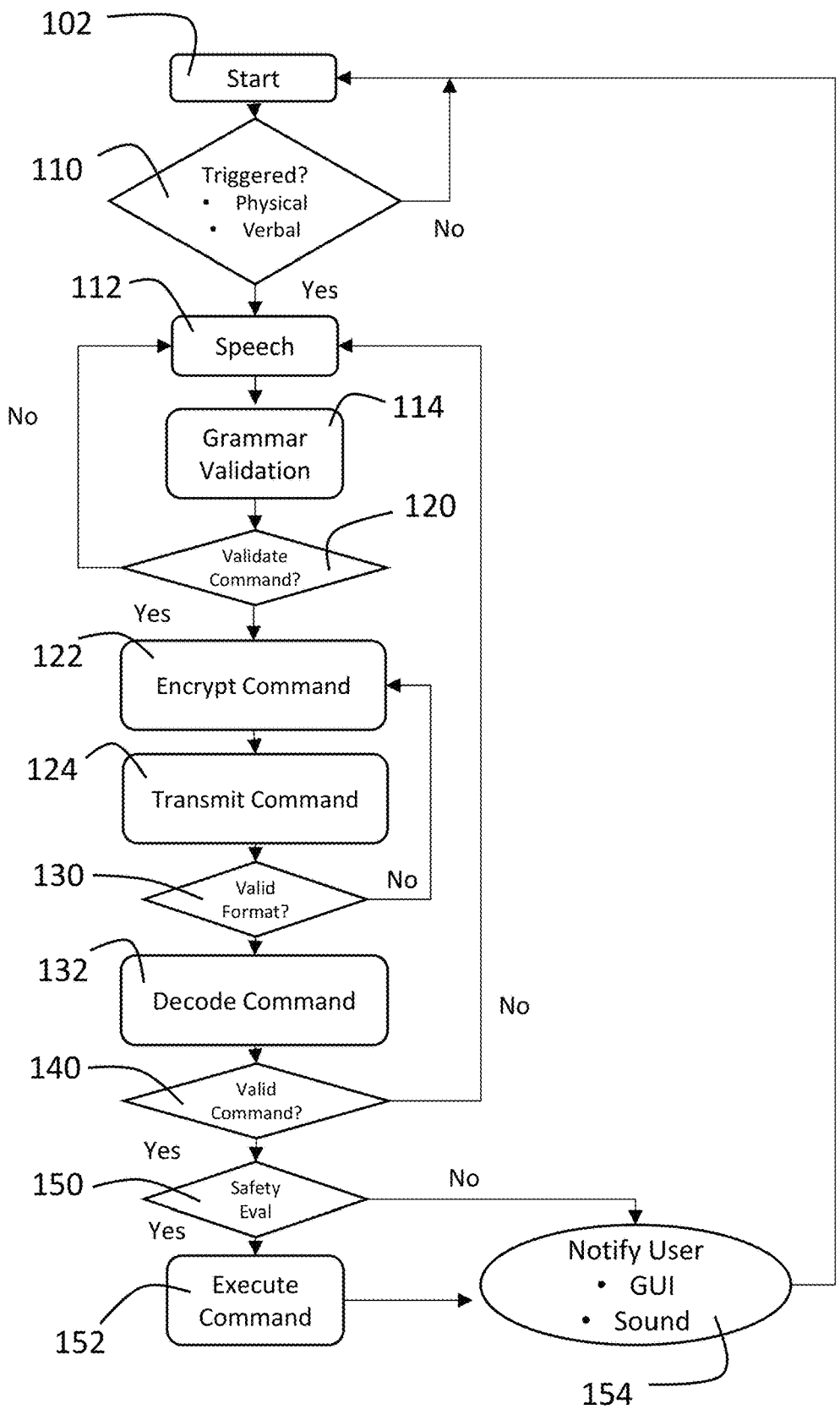
FIG. 1 is a flow chart illustrating a method for voice activation of electronic equipment in an operating room in accordance with a preferred embodiment of the present invention.

A method for voice activation of electronic equipment in an operating room in accordance with a preferred embodiment of the present invention is described with reference to FIG. 1. The method starts 102 with the voice-control system being activated or turned on. Once active or on the voice control system can be triggered 110 through physical or verbal cues or prompts. If a trigger event 110 is detected, the voice control system uses speech recognition software 112 to identify voice instructions. The grammar of the detected speech is then validated 114. If the speech is not validated as a command the system returns to the speech recognition step 112 and/or causes the system to notify the user visually or audibly that the command was not validated or returns to the detection of a new trigger 110. If a command is validated 120, the command is encrypted 122 and transmitted 124 to the electronic operating room equipment to which the command is directed.

The transmitted encrypted commend is received at the electronic equipment, which decodes the comments 132 and determines whether the decoded command is valid 130. If the decoded command is valid, the electronic equipment performs a safety evaluation 150 to ensure that the command can be safely executed. If the decoded command is deemed to be safe, the command is executed by the electronic equipment and the user is notified verbally or visually that the command has been executed. If the command is not deemed to be safe, the user is notified 154 visually or verbally.

Figure 2:
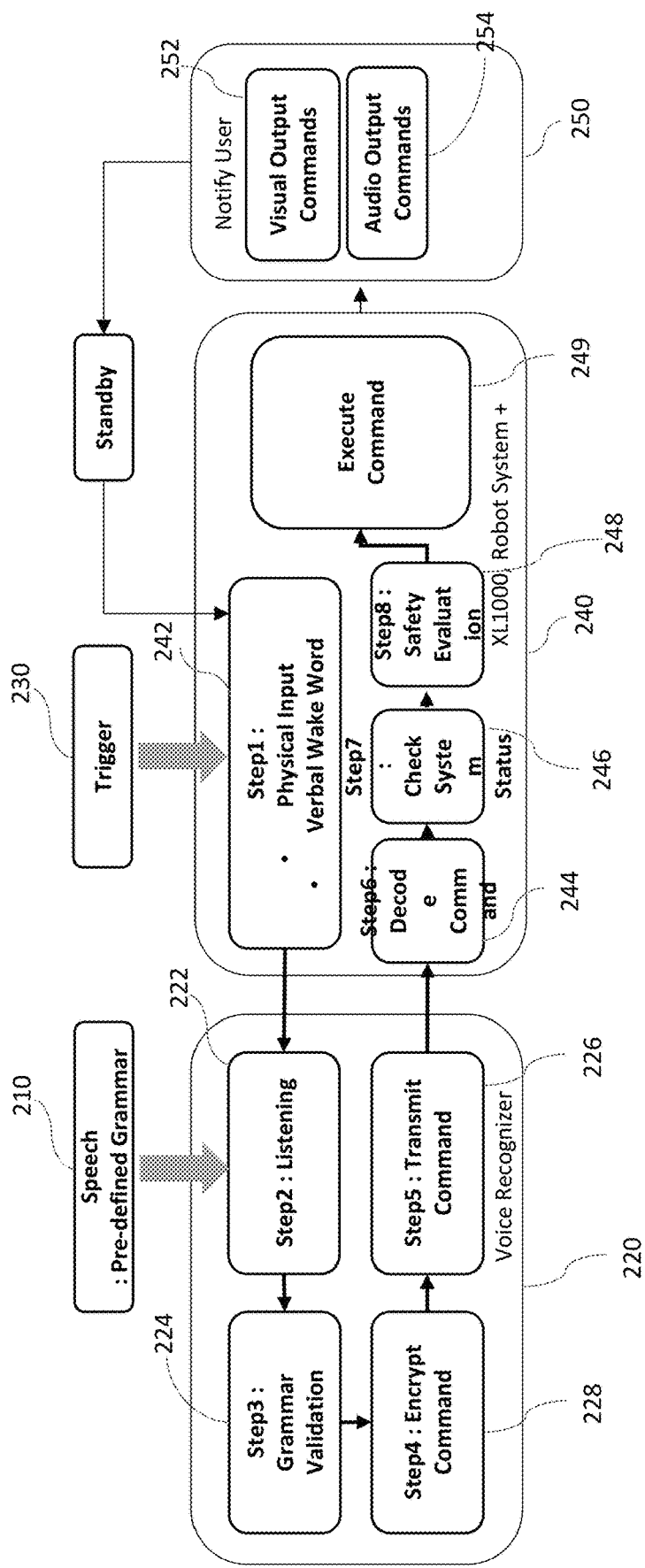
FIG. 2 is a detailed flow diagram of illustrating a method for voice activation of electronic equipment in an operating room in accordance with a preferred embodiment of the present invention.

A method for voice activation of electronic equipment in an operating room in accordance with a preferred embodiment of the present invention is further shown in the detailed flow diagram of FIG. 2. The system has pre-defined grammar (210) for speech recognition stored in memory in a processor or other memory or storage. In a preferred embodiment, the speech recognition system 220 is integrated with an electrosurgical generator so the pre-defined grammar and other speech recognition software is pre-stored in the electrosurgical generator in processor memory, other memory, or other storage in the generator. The operating room electrical equipment (240) that will be used in the procedure is triggered (230), for example, with a physical input or a wake word (242)

Once the system is activated, the speech recognition system or voice recognizer 210 listens for instructions (222). Detected speech is goes through grammar validation (224)

using the pre-defined grammar (210) stored in memory or other storage. If an instruction is recognized and/or validated, the instruction or command is encrypted (226) and transmitted (228) to the equipment needed to perform the instructed task. That electronic equipment may be the electrosurgical generator, a robotic surgical system, a medical imaging system, or other operating room electrical equipment.

The transmitted encrypted command is received by the operating the operating room equipment (240) to which the instruction is directed. The operating room equipment 240 then decodes and decrypts the commend (244). The system status of the operating equipment is checked (246) and a safety evaluation is performed (248). If the commend or instruction is determined to be save the command is executed by the operating room equipment (249). The system has notification capabilities (250) to provide visual (252) or audible (254) confirmation of commands and provide other information to the user.

Figure 3:
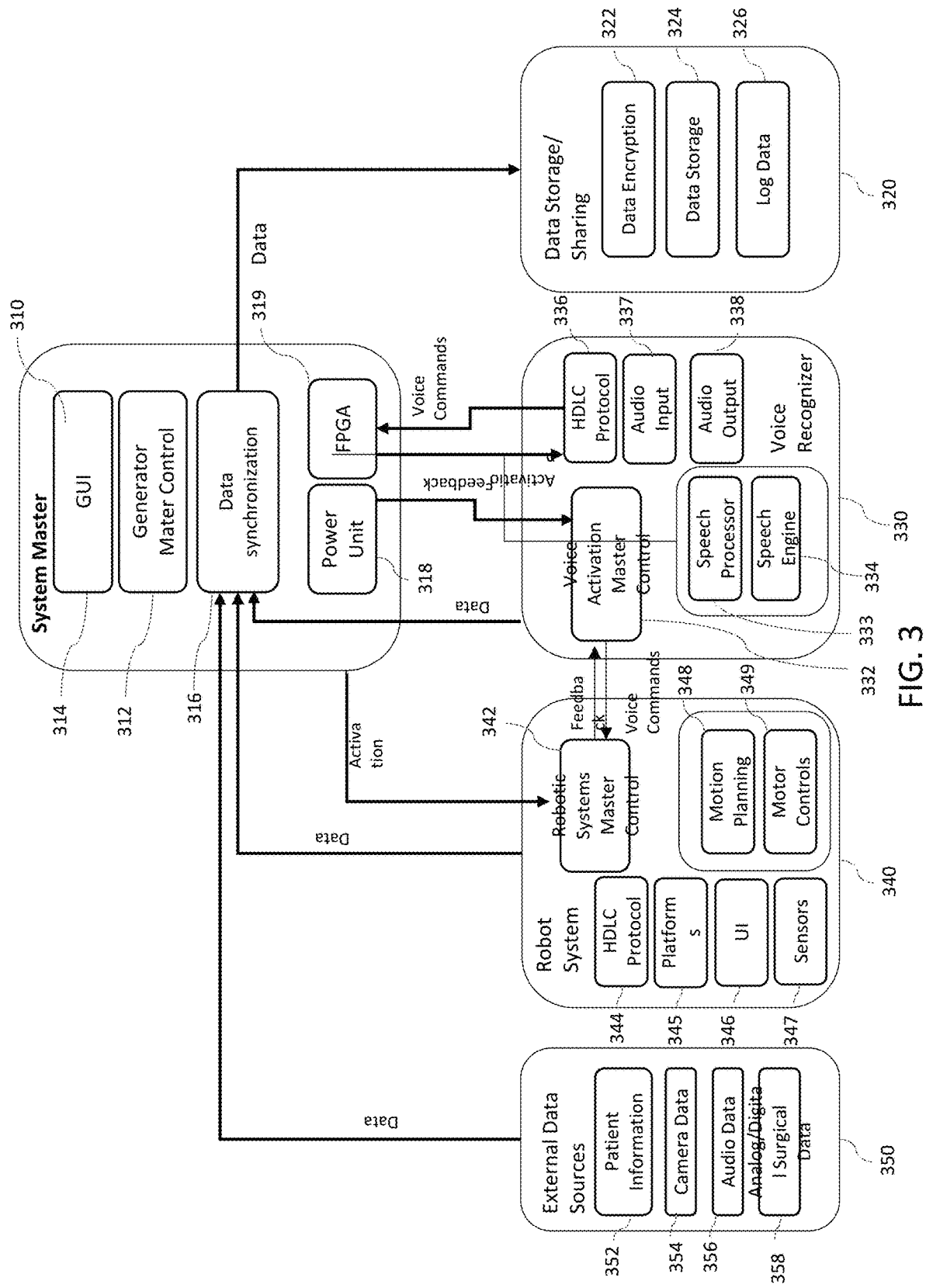
FIG. 3 is a diagram of a system for voice activation of electronic equipment in an operating room in accordance with a preferred embodiment of the present invention.

Further, a system for voice activation of electronic equipment in an operating room in accordance with a preferred embodiment of the present invention is shown in FIG. 3. In a preferred embodiment the electrosurgical generator is the master system 310. The master system 310 has a master control 312, a graphical user interface (GUI) 314, a data synchronization module 316, a power unit 318 and a field programmable gate array (FPGA) 319. The system master 310 has internally or is connected to a data storage or sharing module having data encryption 322, data storage 324 and log data 326. The system master 310 further has internally or is connected to a voice recognition system 330 having a voice activation master control 332, a speech processor 333, speech engine 334, HDLC protocol 336, audio input such as a microphone 337 and an audio output 338 such as a speaker. The microphone may be located in the generator housing or in the electrosurgical accessory such as a cold plasma device. Having the microphone in the accessory has advantages in that the microphone is away from the generator and less susceptible to interference from the other electronics in the generator. Additionally, the electrosurgical accessory may include controls, such as a control button, for activating and deactivating the microphone. The microphone may be control by such a manual control or, for example, by audio control, but the manual control may have a safety advantage in that it cannot be mistakenly activated verbally. Similarly, the device may have both a manual control and voice activation for added safety. External equipment 240 such as a robotic surgical system is controlled with commands from the system master. The exemplary robotic surgical system has a robotic systems master control 342 that receives commands from the voice recognition system 330. The robotic system or other operating room equipment further has, for example, HDLC protocol 344, platforms 345, a user interface (UI) 346 and sensors 347. The robotic system 340 in the example further has motion panning 348 and motor controls 349. The system also may have access to external data sources 350 that may include patient information 352, camera data 354, audio data 356 and analog/digital surgical data 358.

Figure 4A:
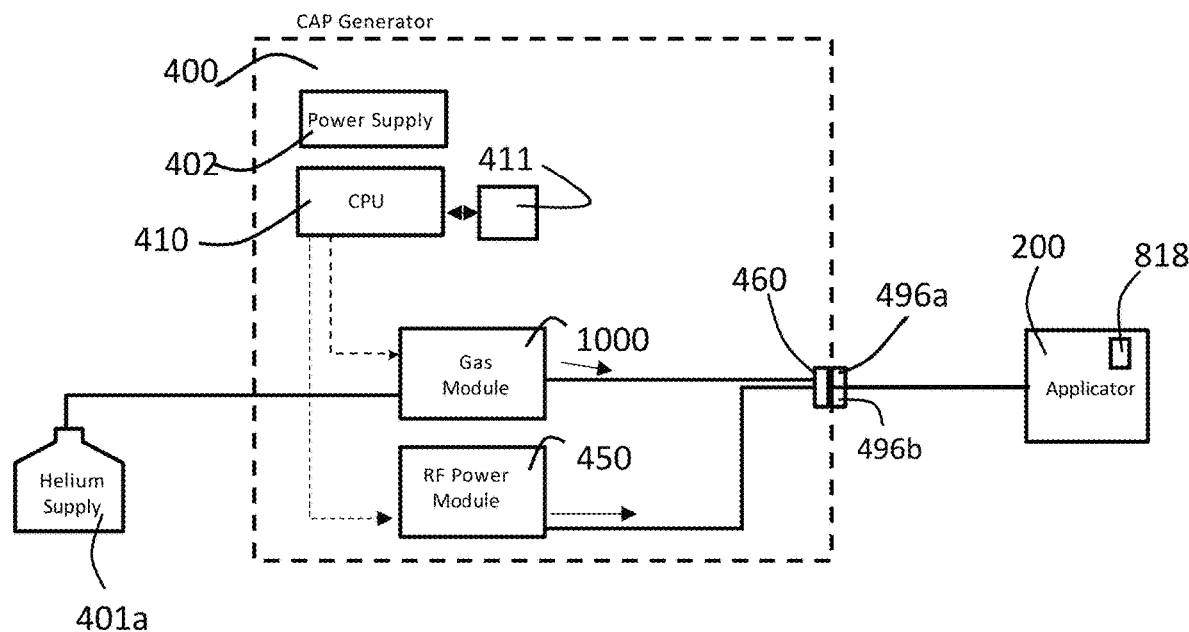
FIG. 4A is a block diagram of a cold atmospheric plasma generator of a preferred embodiment of the present invention.

The system and method of the present invention may be used with a variety of electronic equipment used in an operating room. One such system is a cold atmospheric plasma system. As shown in FIG. 4A, an exemplary cold atmospheric plasma (CAP) generator 400 has a power supply 402, a CPU (or processor or FPGA) 410 and a memory or storage 411. The system further has a display 520 (FIG. 5), which may be the display of a tablet computer. The CPU 410 controls the system and receives input from a user through a graphical user interface displayed on display 520. The CAP generator further has a gas control module 1000 connected to a source 401a of a CAP carrier gas such as helium. The CAP generator 400 further has a radio frequency (RF) power module 450 for generating radio frequency (RF) energy. The RF power module contains conventional electronics such as are known for providing RF power in electrosurgical generators. The RF Power module operates with a frequency between 10-200 kHz and output peak voltage from 3 kV to 6 kV and preferably at a frequency near (within 20%) of 40 Hz, 100 Hz or 200 Hz. The gas module 1000 and RF power module 450 are connected to connector 460 that allows for a CAP accessory to be connected to the generator 400 via a connector having an electrical connector 496a and gas connector 496b.

Figure 4B:
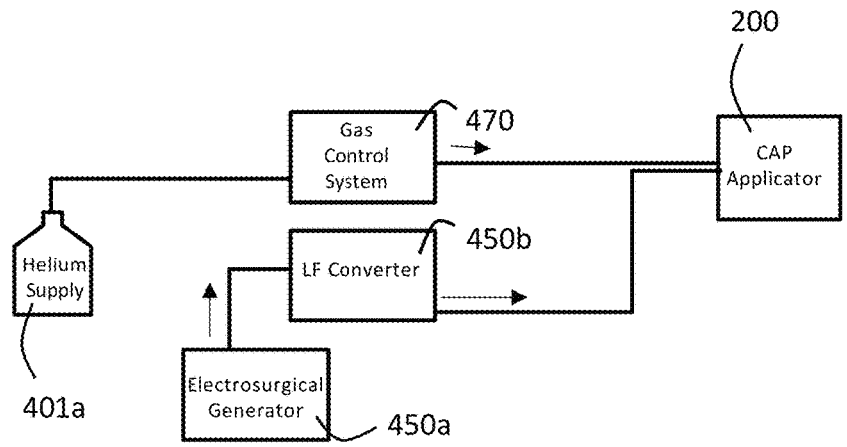
FIG. 4B is a block diagram of a plasma generator of an alternate preferred embodiment of the present invention.

As shown in FIG. 4B, other arrangements for delivery of the carrier gas and the electrical energy may be used with the invention. In FIG. 4B, a source 401a of a carrier gas (helium in this example) is provided to a gas control system 470 of any type, which supply the gas at a controlled flow rate. A conventional electrosurgical generator 450a supplies high frequency (HF) energy to a low frequency converter 450b, which outputs electrical energy having a frequency in the range of 10 kHz to 200 kHz and an output voltage in the range of 3 kV to 6 Kv.

Figure 4C:
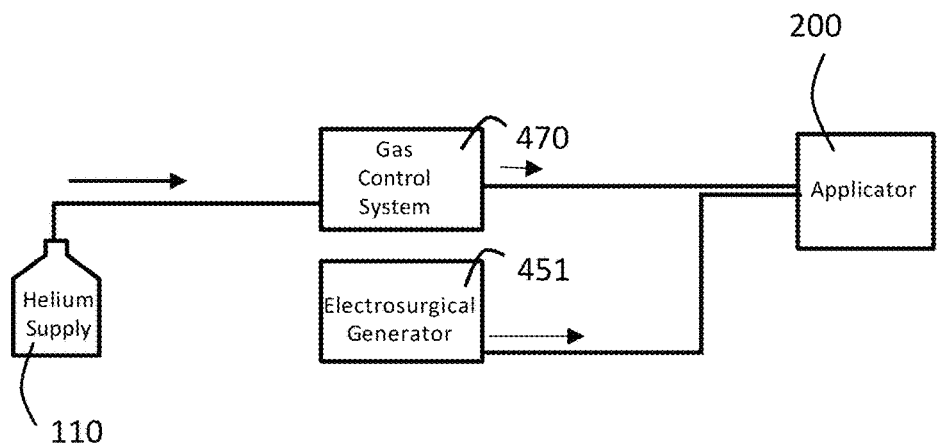
FIG. 4C is a block diagram of a plasma generator of another alternate preferred embodiment of the present invention.

Another embodiment, shown in FIG. 4C, has a gas source 401a connected to a conventional gas control system 470, which in turn is connected to the accessory, and a conventional electrosurgical generator 451 also connected to the accessory.

Figure 4D:
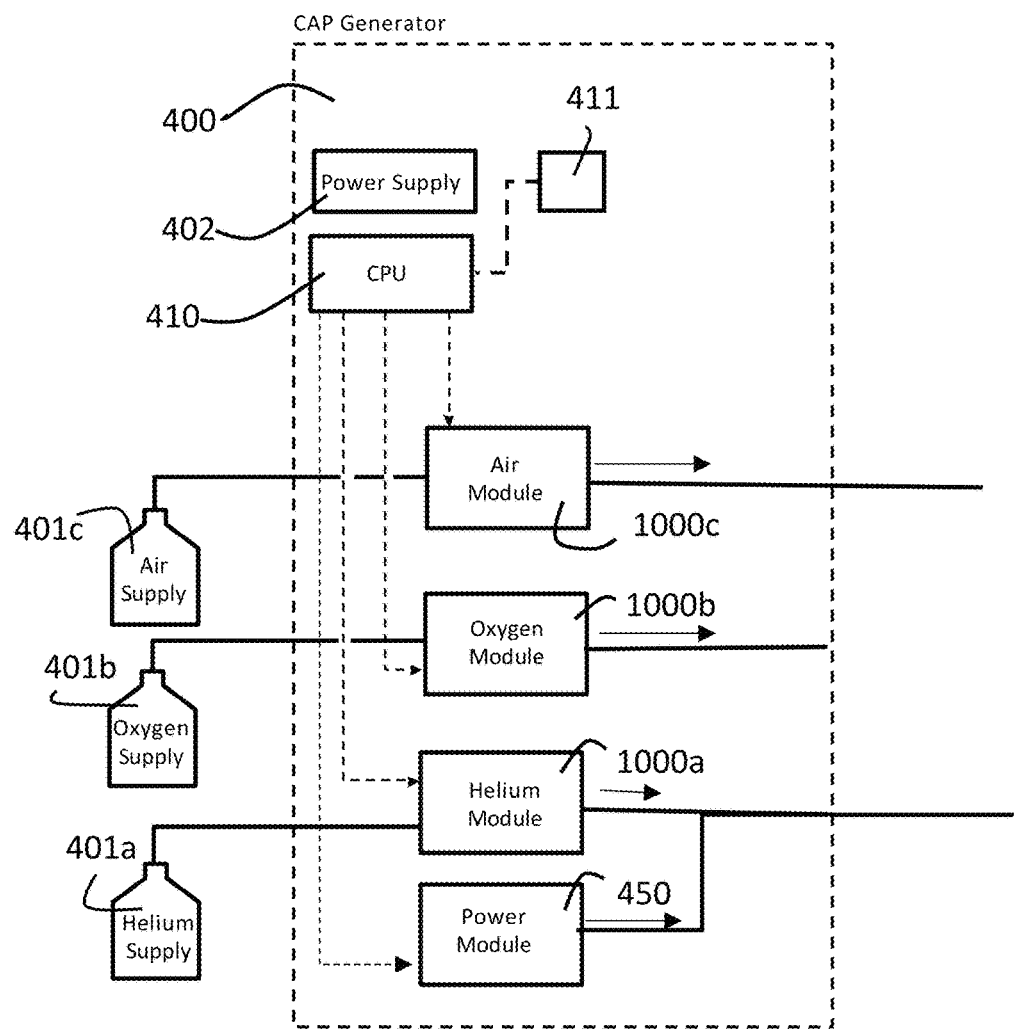
FIG. 4D is a block diagram of an integrated gas-enhanced electrosurgical generator having a plurality of gas modules of another alternate preferred embodiment of the present invention.

FIG. 4d shows an integrated gas-assisted electrosurgical generator having a plurality of gas control modules 1000a, 1000b, 1000c connection to a plurality of gas sources 401a, 401b, 401c.

Figure 5:
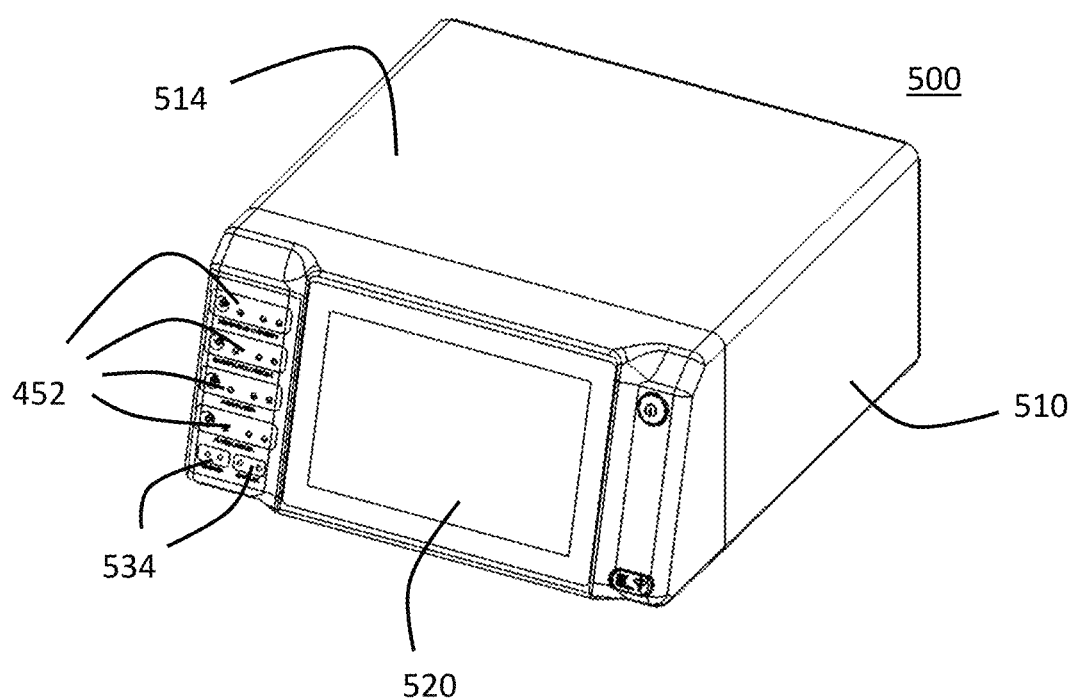
FIG. 5 is a perspective view of an integrated gas-enhanced electrosurgical generator of a preferred embodiment of the present invention.
Figure 6:
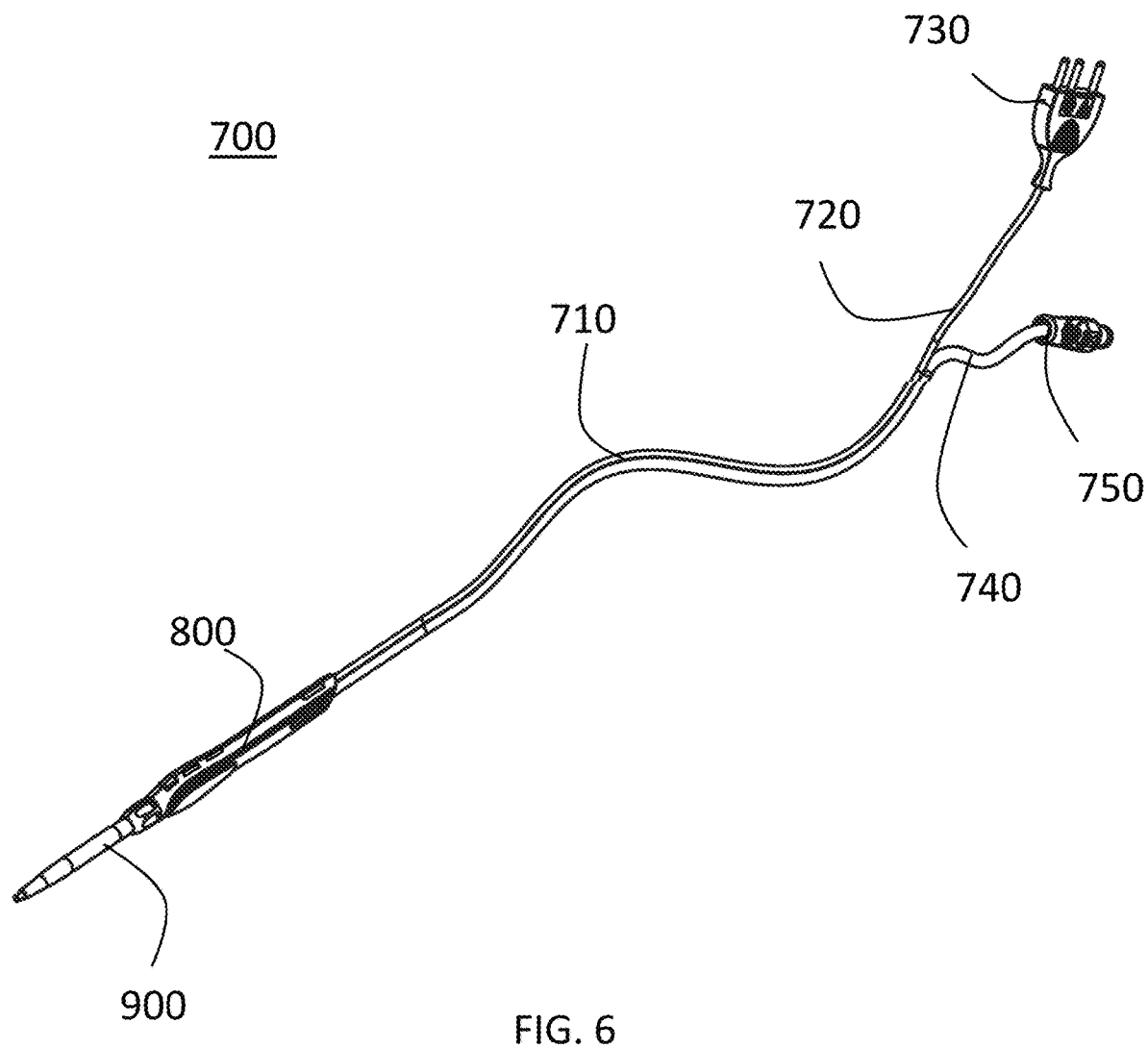
FIG. 6 is a perspective view of an electrosurgical accessory having a cold plasma scalpel in accordance with a preferred embodiment of the present invention.
Figure 7A:
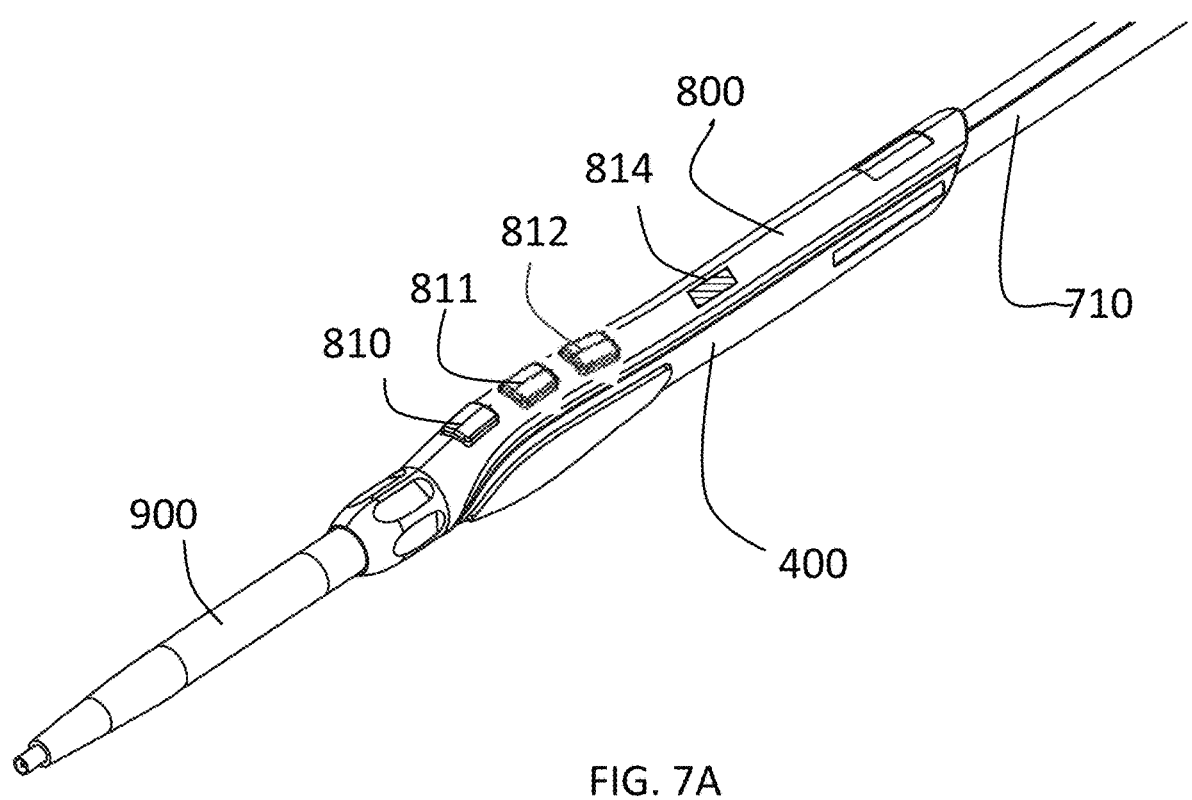
FIG. 7A is a perspective view of a cold plasma scalpel and electrosurgical hand piece in accordance with a preferred embodiment of the present invention.
Figure 7B:
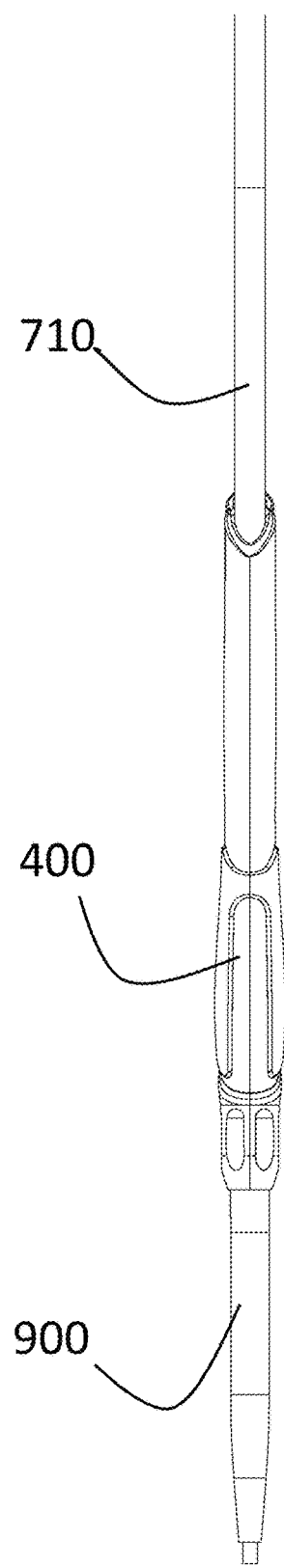
FIG. 7B is a bottom view of a cold plasma scalpel and electrosurgical hand piece in accordance with a preferred embodiment of the present invention.
Figure 7C:
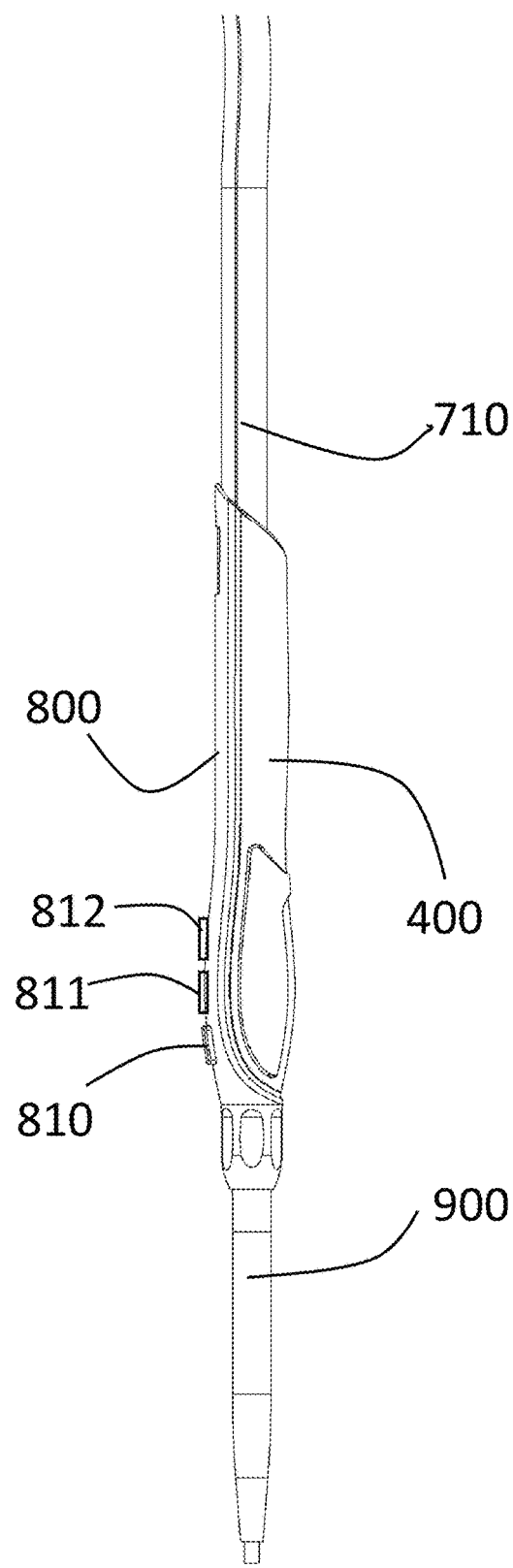
FIG. 7C is a first side view of a cold plasma scalpel and electrosurgical hand piece in accordance with a preferred embodiment of the present invention.

A housing 500 for a CAP-enabled gas-enhanced electrosurgical generator 500 in accordance with a preferred embodiment of the present invention is shown in FIG. 5. The gas-enhanced generator 500 has a housing 510 made of a sturdy material such as plastic or metal similar to materials used for housings of conventional electrosurgical generators. The housing 510 has a removable cover 514. The housing 510 and cover 514 have means, such as screws, tongue and groove, or other structure for removably securing the cover to the housing. The cover 514 may comprise just the top of the housing or multiple sides, such as the top, right side, and left side, of the housing 510. The housing 510 may have a plurality of feet or legs attached to the bottom of the housing. The bottom of the housing 510 may have a plurality of vents for venting from the interior of the gas-enhanced generator.

On the face of the housing 514 there is a touchscreen display 520 and a plurality of connectors 532, 534 for connecting various accessories to the generator, such as an argon plasma probe, a hybrid plasma probe, a cold atmospheric plasma probe, or any other electrosurgical attachment. The face of the housing 510 is at an angle other than 90 degrees with respect to the top and bottom of the housing 510 to provide for easier viewing and use of the touch screen display 520 by a user. One or more of the gas control modules may be mounted within a gas-enhanced electrosurgical generator 500.

The CAP-enabled gas-assisted electrosurgical generator has a graphical user interface (GUI) for controlling the components of the system using the touch screen display 520. The graphical user interface for example, may control robotics, argon-monopolar cut/coag, hybrid plasma cut, cold atmospheric plasma, bipolar, plasma sealer, hemo dynamics or voice activation. The graphical user interface further may be used with fluorescence-guided surgery. The graphical user interface (GUI) further may be used with guided imaging such as CT, MRI, or ultrasound. The graphical user interface may communicate with RFID (such as may be found in various electrosurgical attachments) and may collect and store usage data in a storage medium. The graphical user interface communicates with the field-programmable gate array ("FPGA"), which may control an irrigation pump, insufflator, full bridge for adjusting the power output, fly back for regulating the power (DC to AC) and a foot pedal. The GUI further communicates with a database of data with associated predicted CAP settings or dosages via the CPU 410. The database storage may be internal memory or other internal storage 411 or external storage.

A preferred embodiment of a cold plasma scalpel according to the present invention is described with reference to the figures. An accessory 700 has a top side piece 800a and a bottom side piece 800b. A control button 810 extends from the interior of the hand piece through an opening in the top side piece 800a. Within the hand piece is body connector funnel 806, PCB board 808, electrical wiring 720 and hose tubing (PVC medical grade) 740. The wiring 720 and hose tubing 740 are connected to one another to form a wire and tubing bundle 710. A grip over mold 820 extends over the bottom piece portion 800b. In other embodiments, a grip may be attached to the bottom piece 800b in other manners. A probe or scalpel assembly 900 is attached to the end of the hand piece. The scalpel assembly 900 has non-bendable telescoping tubing 910, a ceramic tip 720, a column nut or collet 930 and body connector tubing 802. The hose tubing 740 extends out of the proximal end of the hand piece to a body gas connector 750, which has an O-ring 752, gas connector core 754 and gas connector tip 756 for connecting to a source of gas (not shown). The printed circuit board 808 connects to electrical wiring 720 which leads to electrical connector 730 having electrical pins 732.

The collet 930 has a body having a plurality of depressions or dimples on its exterior for gripping the collet. The interior of the collet 930 has threads for engaging with threads on the hand piece 800.

Figure 8:
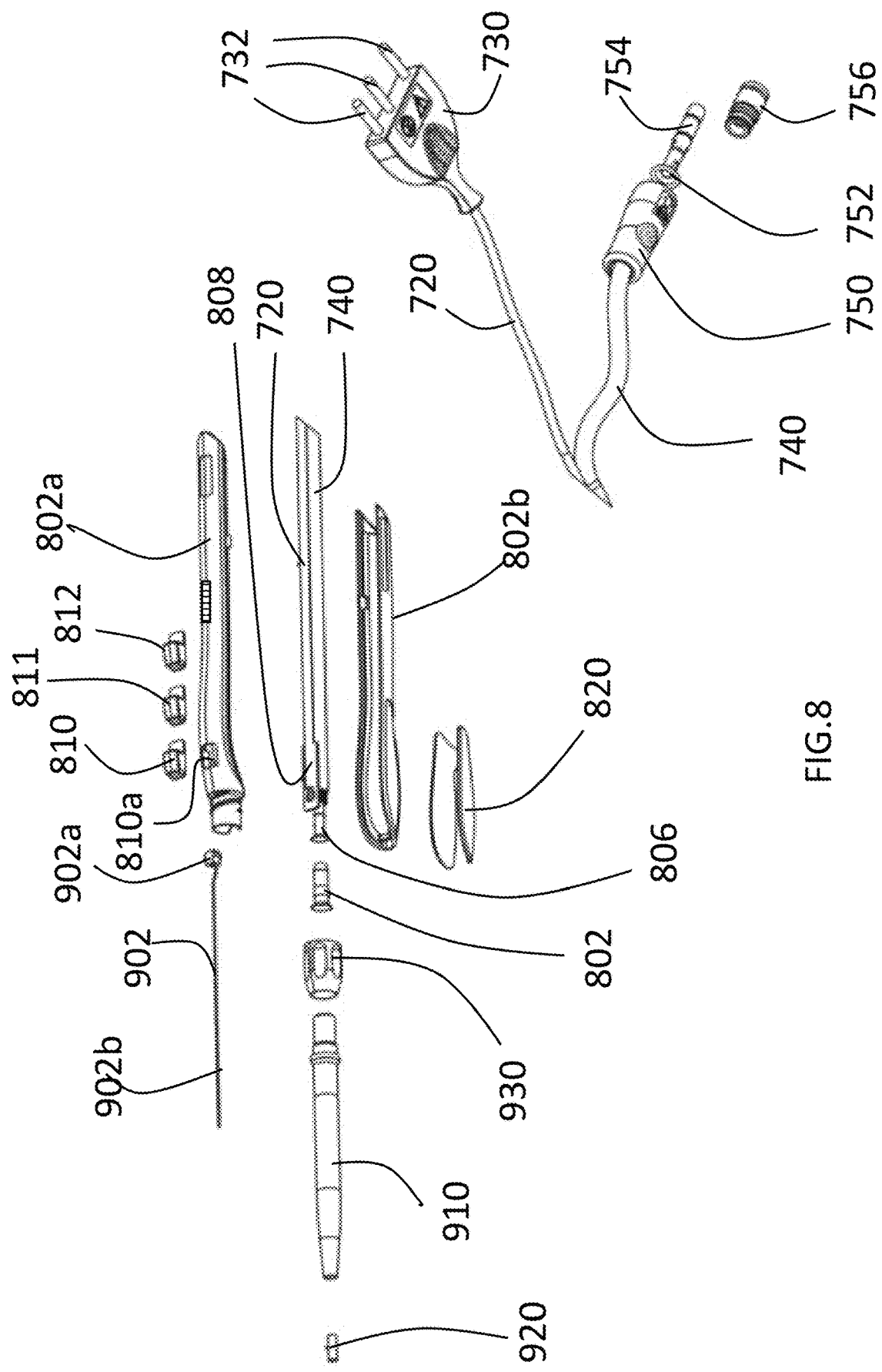
FIG. 8 is an assembly view of a cold plasma scalpel in accordance with a preferred embodiment of the present invention.

The hand piece 800 has a housing having an upper portion 800a shown in FIG. 8. The upper portion 902a has a plurality of openings 810a for receiving control buttons. Although only one opening 810a is shown in this embodiment, other embodiments with additional openings for additional control buttons will be apparent to those of skill in the art. While the control buttons are shown on the top of the hand piece 900, one of skill in the art will understand that the control buttons may be on the bottom or sides of the hand piece 900. The upper portion 800a has a ridge structure along its sides and tabs for mating with the bottom portion 800b. The upper portion 800a has a neck having threads for mating with the threads on the collet 930. The neck additionally may have a self-alignment feature. On the interior of the upper portion 800a adjacent the hole is a pair of support elements for supporting PCB board 808 and control buttons 810, 811, 812 for controlling gas flow, electricity, and a microphone. Additional support elements support the PCB board and support a microphone chip (integrated circuit microphone) 818 adjacent the grated opening 814. A foot pedal or pedals may be used in addition or instead of a control button to control gas flow and/or electricity. The bottom portion 800b of the hand piece 800 has a body a pair of grip portions or a grip over mold 820, grooves for engaging with the tabs in the upper portion 800a, and a ridge structure for engaging with the ridge structure in the upper portion 800a of the hand piece 800, and a slot for engaging with a tab in the top piece.

As discussed previously, the scalpel assembly 900 has a housing or body 910 having a channel within it, a ceramic tip 920, a column nut or collet 930. The housing 910 has a tapered portion near its distal end, an outer shoulder and a pair of inner shoulders. The housing or body 910 may be telescoping and may be comprised of telescoping tubing. The housing or body 910 has a proximal end that connects to the hand piece 800 by means of collet 930 and a distal end extending away from the hand piece 800. Within the proximal end of the housing or body 910 is a lip, flange or other support member for receiving an electrode connector. The tubing 910 may be of any length from a few millimeters to tens of centimeters or longer. Near the distal end of the housing 910 is a constrictor having within it an obstruction that provides for increased flow velocity of a gas flowing through the attachment when in use.

An electrode 902 is inserted into the distal end of the tubing, housing or body 910. The electrode has a connector and a wire or elongated portion. The connector and wire may be formed from the same or different materials. For example, the connector may be nickel-plated brass and the wire tungsten. The connector is at the proximal end of the electrode and has a connector body 902a having a beveled or rounded distal end and a proximal end. The connector may generally be cylindrical in shape but may have a flat portion for alignment of the electrode in the housing 910. The connector body 902a has a channel extending through it and a ridge, shoulder or flange. The wire 902b of the electrode is connected to the distal end of the connector adjacent the opening and extends from the distal end of the connector. The wire 902b may have a bent portion to place the distal end of the wire 902b in the center of the channel in housing 910. There also may be a support element to hold the wire 902b in the center of the channel.

When the attachment 900 is fully assembled, the wire 902b extends down approximately the center of the channel in the housing 910 to a position near or extending from the distal end of the housing 910 and the ceramic tip 720. The distal face of the connector body 902a rests on shoulder 720 in housing 910 and the electrode shoulder 712 rests on the shoulder of housing 910. A rounded or beveled portion of the connector provides a conductive surface for making a connection to connector 802.

During use, an inert gas such as helium or argon flows from a gas source, through the hand piece and into the channel within the housing 910. The gas flows through the opening 740 in the connector body 902a and down the channel in the housing 910. The gas flowing down the channel in the housing 910 surrounds the wire 902b. Electrical energy is supplied from an electrosurgical generator and flows through connector 750 to wire 720, through the hand piece and various connectors to the electrode. As the gas flows through the attachment, the electrode connector 902a and the wire 902b highly ionize the gas so the gas becomes a cold plasma. The system is monopolar, so the attachment and hand piece include only the active electrode. A conductive plate may be placed under the patient and acts as the return electrode or ground.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for voice control of electrical operating room equipment with a speech recognition system in an electrosurgical generator, the method comprising:
   activating a microphone on an electrosurgical accessory connected to said electrosurgical generator;
   communicating audio input received by said microphone in said electrosurgical accessory to the speech recognition system in the electrosurgical generator in response to activation of the microphone in the electrosurgical accessory;
   detecting a triggering event with the speech recognition system;
   identifying a voice instruction with said speech recognition system;
   validating grammar in an identified voice instruction;
   notifying the user that a voice command has been validated;
   encrypting the validated command;
   transmitting the encrypted validated command to electrical operating room equipment;
   receiving the encrypted validated command at the electrical operating room equipment;
   decrypting the received encrypted validated command at the electrical operating room equipment;
   determining at the electrical operating room equipment whether the decrypted command is valid;
   performing a safety evaluation on said decrypted command;
   if said decrypted command is determined to be safe, executing said decrypted command on the electrical operating room equipment; and
   notifying the user whether the decrypted command has been executed.

2. The method for voice control of electrical operating room equipment according to claim 1, wherein the electrical operating room equipment is the electrosurgical generator.

3. The method for voice control of electrical operating room equipment according to claim 1, wherein the electrical operating room equipment is a robotic surgical system.

* * * * *